United States Patent
Sitton

(10) Patent No.: US 8,423,397 B2
(45) Date of Patent: Apr. 16, 2013

(54) ASSET MANAGEMENT SYSTEMS AND METHODS

(75) Inventor: Ryan Sitton, Pearland, TX (US)

(73) Assignee: PinnacleAIS, LLC, Pasadena, TX (US)

( * ) Notice: Subject to any disclaimer, the term of this patent is extended or adjusted under 35 U.S.C. 154(b) by 1056 days.

(21) Appl. No.: 12/188,255

(22) Filed: Aug. 8, 2008

(65) Prior Publication Data

US 2010/0036702 A1    Feb. 11, 2010

(51) Int. Cl.
*G06Q 10/00*    (2012.01)
(52) U.S. Cl.
USPC ....... 705/7.28; 705/7.12; 705/7.22; 705/7.36; 705/7.41
(58) Field of Classification Search ........... 705/7.12, 705/7.22, 7.28, 7.36, 7.41
See application file for complete search history.

(56) References Cited

U.S. PATENT DOCUMENTS

| | | | |
|---|---|---|---|
| 4,160,239 A | 7/1979 | Adamson | |
| 4,349,869 A | 9/1982 | Prett et al. | |
| 4,719,587 A | 1/1988 | Berte | |
| 4,945,775 A | 8/1990 | Adams et al. | |
| 4,998,208 A | 3/1991 | Buhrow et al. | |
| 5,050,108 A | 9/1991 | Clark | |
| 5,274,572 A | 12/1993 | O'Neill et al. | |
| 5,351,725 A | 10/1994 | Suthergreen et al. | |
| 5,381,136 A | 1/1995 | Powers et al. | |
| 5,940,290 A | 8/1999 | Dixon | |
| 6,379,540 B2 | 4/2002 | Reicks | |
| 6,633,782 B1 | 10/2003 | Schleiss et al. | |
| 6,742,000 B1 | 5/2004 | Fantasia et al. | |
| 6,871,160 B2 | 3/2005 | Jaw | |
| 6,913,083 B2 | 7/2005 | Smith | |
| 6,967,589 B1 | 11/2005 | Peters | |
| 6,968,293 B2 | 11/2005 | Wiegand | |
| 7,027,924 B2 | 4/2006 | Spoonhower et al. | |
| 7,058,544 B2 * | 6/2006 | Uzarski et al. | 702/184 |
| 2003/0005486 A1 * | 1/2003 | Ridolfo et al. | 800/288 |
| 2003/0191606 A1 * | 10/2003 | Fujiyama et al. | 702/185 |
| 2004/0049297 A1 * | 3/2004 | Card et al. | 700/28 |
| 2004/0243462 A1 * | 12/2004 | Stier | 705/11 |
| 2005/0149570 A1 * | 7/2005 | Sasaki et al. | 707/104.1 |
| 2006/0041459 A1 * | 2/2006 | Hester et al. | 705/8 |
| 2007/0083398 A1 * | 4/2007 | Ivey et al. | 705/4 |
| 2007/0229508 A1 | 10/2007 | Connor et al. | |
| 2007/0239368 A1 * | 10/2007 | Marrano et al. | 702/34 |

(Continued)

OTHER PUBLICATIONS

Sitton, Ryan, U.S. Appl. No. 11/836,759, "System, Method, and Computer Readable Storage Medium to Determine Optimization of Assets", filed Aug. 9, 2007.

*Primary Examiner* — Kevin Flynn
(74) *Attorney, Agent, or Firm* — Krueger Iselin LLP

(57) ABSTRACT

Systems, methods, and software for reliability, hazard, and integrity optimization are disclosed. In at least some embodiments, the software includes an input module, a failure model module, a simulation module, and an optimization module. The input module accepts a list of assets to be managed and determines design data and process data for each asset. The failure model module determines probability of failure curve parameters for each asset degradation mode. The simulation module simulates an asset management plan to determine a total management cost that includes costs for predicted failures as well as risk-weighted costs for each degradation mode of each asset generates alternative management plans for evaluation by the simulation module and provides a selected management plan for display to a user. In each embodiment, the total management costs may account not only for direct costs, but also for safety costs, environmental costs, and business costs.

20 Claims, 11 Drawing Sheets

U.S. PATENT DOCUMENTS

| | | |
|---|---|---|
| 2008/0036781 A1 | 2/2008 | Okada |
| 2008/0154458 A1* | 6/2008 | Brandstetter et al. ........... 701/29 |
| 2008/0172267 A1* | 7/2008 | Hotta et al. ....................... 705/7 |
| 2009/0083089 A1* | 3/2009 | Conchieri et al. ................. 705/7 |
| 2009/0292574 A1* | 11/2009 | Pop et al. .......................... 705/8 |
| 2010/0036866 A1 | 2/2010 | Sitton |

* cited by examiner

FIG. 1
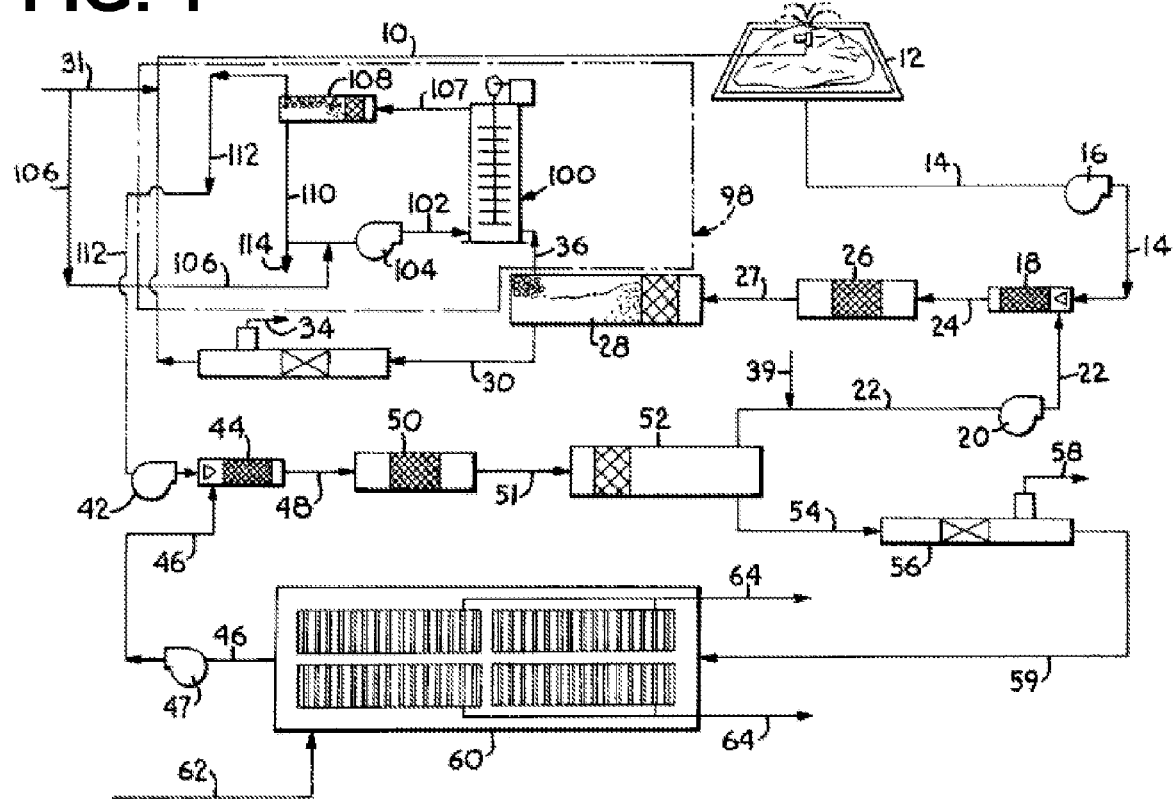
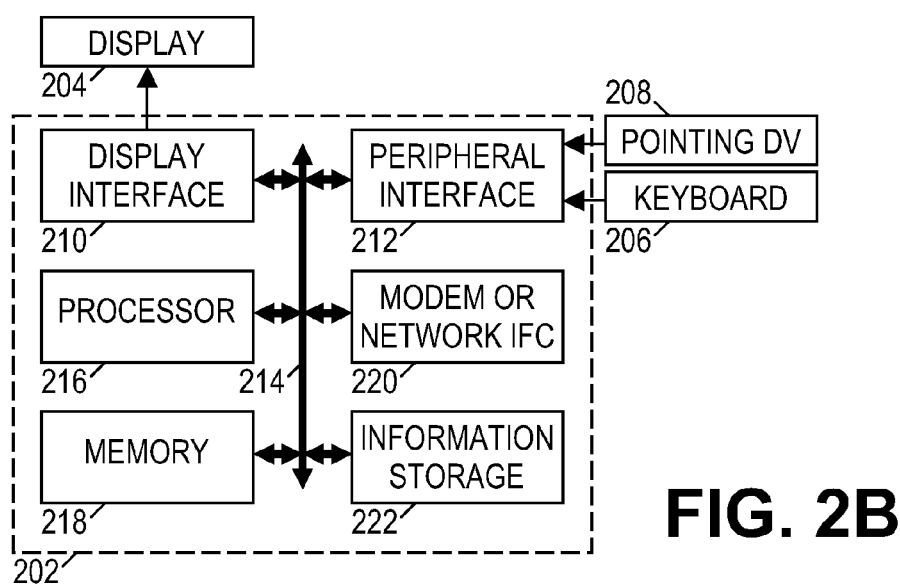
FIG. 2B

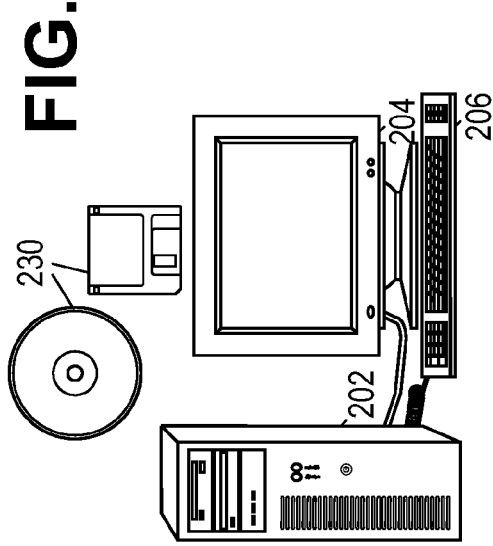

| EVENT | DISASSEMBLY | REASSEMBLY | CLEANING | SCAFFOLDING | INSULATION | PAINT | CHEM TREATMENT/ INJECTION - UPSET | REPAIR (MINOR) | REPAIR (MAJOR) | REPLACEMENT |
|---|---|---|---|---|---|---|---|---|---|---|
| INSPECTION (INTRUSIVE) | Y | Y | Y | N | N | N | N | N | N | N |
| INSPECTION (NON-INTRUSIVE) | N | N | N | Y | N | N | N | N | N | N |
| INSPECTION (AUT ONLY) | N | N | N | Y | Y | N | N | N | N | N |
| FAILURE (LEAK) | Y | Y | N | Y | Y | Y | Y | Y | N | N |
| FAILURE (CATASTROPHIC) | Y | Y | Y | Y | Y | Y | Y | N | Y | Y |
| FAILURE (FOULING) | Y | Y | Y | Y | N | N | Y | Y | N | N |
| FAILURE (INTERNALS/BUNDLE) | Y | Y | Y | Y | N | N | Y | Y | N | N |
| ... | | | | | | | | | | |

FIG. 3

| TECHNIQUE | SHUTDOWN? | INTRUSIVE? | COST (US$) | % PROBABILITY OF DETECTION BY DEGRADATION MODE ||||||||||
|---|---|---|---|---|---|---|---|---|---|---|---|---|---|---|
| | | | | EXTERNAL NON INS | CUI | THIN GEN | THIN PART LOC | THIN HIGH LOC | CRACK STRESS | CRACK NON-STRESS | CREEP | MECH | INTERNALS/BUNDLE | FOULING |
| EXTERNAL VISUAL | N | N | 500 | 99 | 5 | 0 | 0 | 0 | 0 | 0 | 0 | 0 | 0 | 0 |
| INTERNAL VISUAL | Y | Y | 1000 | 0 | 0 | 80 | 70 | 70 | 30 | 15 | 5 | 90 | 5 | 75 |
| EXTERNAL UT | * | N | 250 | 20 | 5 | 90 | 50 | 20 | 2 | 0 | 0 | 0 | 0 | 0 |
| INTERNAL UT | Y | Y | 500 | 0 | 2 | 99 | 90 | 70 | 10 | 5 | 0 | 90 | 20 | 75 |
| MAGNETIC PARTICLE | Y | Y | 700 | 0 | 0 | 0 | 10 | 10 | 80 | 70 | 0 | 90 | 20 | 75 |
| PENETRANT TEST | Y | Y | 500 | 0 | 0 | 0 | 0 | 0 | 50 | 50 | 0 | 90 | 20 | 75 |
| RADIOGRAPHIC TEST | Y | Y | 1000 | 0 | 3 | 75 | 25 | 10 | 60 | 30 | 10 | 90 | 20 | 75 |
| PROFILE RADIOGRAPHY | N | N | 3000 | 0 | 5 | 0 | 75 | 50 | 30 | 20 | 0 | 0 | 0 | 0 |
| AC FIELD MEASUREMENT | Y | Y | 4000 | 0 | 0 | 0 | 15 | 10 | 95 | 80 | 0 | 90 | 20 | 75 |
| UT SHEAR WAVE | * | N | 1500 | 20 | 10 | 60 | 10 | 5 | 80 | 40 | 0 | 0 | 0 | 0 |
| TUBE EDDY CURRENT | Y | Y | 2500 | 0 | 0 | 90 | 75 | 60 | 5 | 0 | 20 | 25 | 95 | 95 |
| PULSED EDDY CURRENT | N | N | 4000 | 40 | 25 | 80 | 40 | 10 | 0 | 0 | 0 | 0 | 0 | 0 |
| CUI EXTERNAL VISUAL | N | N | 1000 | 95 | 80 | 0 | 0 | 0 | 0 | 0 | 0 | 0 | 0 | 0 |
| AUTOMATED UT | * | N | 3000 | 95 | 30 | 90 | 80 | 60 | 60 | 30 | 10 | 0 | 0 | 0 |
| STRAPPING | Y | Y | 500 | 50 | 50 | 0 | 0 | 0 | 0 | 0 | 60 | 0 | 0 | 0 |

* SHUTDOWN REQUIRED ONLY IF SURFACE TEMPERATURE EXCEEDS 500°

FIG. 5

| FLUID | SEVERITY OF EXPOSURE | ENVIRONMENTAL COST (US$) |
|---|---|---|
| AIR | 5% | 0 |
| WATER | 5% | 1000 |
| HF ACID | 100% | 20,000 |
| ... | | |

FIG. 6

| ASSET TYPE | VALUE FACTOR |
|---|---|
| DRUM | 0.5 |
| EXCHANGER | 1.0 |
| REACTOR | 0.7 |
| TOWER | 0.7 |
| AIR FIN | 0.25 |

FIG. 7

| ACTIVITY | EXCHANGER MH | $ | BUNDLE MH | $ | AIR-FIN MH | $ | DRUM MH | $ | HEATER MH | $ | COLUMN/TOWER MH | $ | PIPING CIRCUIT MH | $ |
|---|---|---|---|---|---|---|---|---|---|---|---|---|---|---|
| DISASSEMBLY | | | | | | | | | | | | | | |
| REASSEMBLY | | | | | | | | | | | | | | |
| CLEANING | | | | | | | | | | | | | | |
| SCAFFOLDING | | | | | | | | | | | | | | |
| INSULATION | | | | | | | | | | | | | | |
| PAINT | | | | | | | | | | | | | | |
| CHEM TREATMENT/ INJECTION NORMAL OPS (PER YEAR) | | | | | | | | | | | | | | |
| CHEM TREATMENT/ INJECTION UPSET | | | | | | | | | | | | | | |
| REPAIR (MINOR) | | | | | | | | | | | | | | |
| REPAIR (MAJOR) | | | | | | | | | | | | | | |
| REPLACEMENT | | | | | | | | | | | | | | |

| ASSET # | ASSET TYPE | UNIT | DESCRIPTION | LOCATION |
|---|---|---|---|---|
| 1 | PUMP | P100-1 | CIRCULATION PUMP | A4 |
| 2 | CIRCUIT | HP12-3 | HIGH-PRESSURE 12" TUBING | A4-B4 |
| 3 | EXCHANGER | X230-1 | HIGH CAPACITY EXCHANGER | B4 |
| 4 | CIRCUIT | HP4-5 | HIGH-PRESSURE 4" TUBING | B4-B5 |
| 5 | REACTOR | RC2-2 | CUSTOM CATALYTIC CRACKER | B5 |
| 6 | CIRCUIT | HP4-6 | HIGH-PRESSURE 4" TUBING | B5 |
| ... | ... | ... | ... | ... |

252 {
IDENTIFICATION
UNIT:_____ ASSET#:_____
DESCR:_____ AST TYPE:_____
NEW/RENEWAL DATE:_____

254 {
DESIGN/CONSTRUCTION DATA
PRESSURE:___ DSN TEMP:_____
MATERIAL:____ INSULATION:___
DIAMETER:____ LENGTH:_____
THICKNESS:___ MIN THICKN:____
INSPECT TH:___ INSPECT DT:___
EXPOSURE:___ RAV:_____

256 {
PROCESS DATA
FLUID1:_____ %FLUID1:_____
FLUID2:_____ %FLUID2:_____
OP TEMP:_____ OP PRESS:_____
CYCLIC:_____ OUTAGE:_____

FIG. 10

| IDENTIFICATION UNIT: _____ ASSET#: _____ DESCR: _____ | | | | |
|---|---|---|---|---|
| DEGRADATION DATA | | | | |
| DEGRADATION MODE | RATE/ SUSC | LAST INSP DT | LAST INSP TECHNIQ | CONST. |
| EXTERNAL NON-INS | | | | |
| CORR UNDER INSUL | | | | |
| THINNING (GENERAL) | | | | |
| THINNING (PART LOC) | | | | |
| THINNING (HIGH LOC) | | | | |
| CRACKING (STRESS) | | | | |
| CRACKING (NONSTR) | | | | |
| CREEP | | | | |
| MECHANICAL | | | | |
| INTERNALS/BUNDLE | | | | |
| FOULING | | | | |

| IDENTIFICATION UNIT: _____ ASSET#: _____ DESCR: _____ AST TYPE: _____ | | |
|---|---|---|
| ACTIVITY COST DATA | | |
| ACTIVITY | MAN HOURS | COST (US$) |
| DISASSEMBLY | | |
| REASSEMBLY | | |
| CLEANING | | |
| SCAFFOLDING | | |
| INSULATION | | |
| PAINT | | |
| CHEM TREATM/ INJ – NORMAL | | |
| OPS (PER YEAR) | | |
| CHEM TREATM/ INJ – UPSET | | |
| REPAIR (MINOR) | | |
| REPAIR (MAJOR) | | |
| REPLACEMENT | | |

260

| CONSISTENCY | BETA | CONSIST. FACTOR (CORR, CRACKING, CREEP) | CONSIST. FACTOR (FOULING, INTERNALS, MECHANICAL, BUNDLE, CATASTROPHIC) |
|---|---|---|---|
| NONE | 1 | 0.2 | 0 |
| LOW | 3 | 0.1 | 0 |
| MEDIUM | 5 | 0.05 | 0 |
| HIGH | 9 | 0 | 0 |

| FAILURE MODE | TIME ZERO | A |
|---|---|---|
| CORROSION | DATE OF BASELINE MEASUREMENT | MREMLIFE*2 |
| CRACKING & CREEP | DATE NEW OR APPLICABLE INSP SHOWING NO CRACKS | MREMLIFE |
| FOULING, INTERNALS, MECH, BUNDLE | DATE OF INSPECTION OR REPAIR | MTBF |
| CATASTROPHIC | DATE NEW OR RENEW | 4*MIN(MREMLIFE) |

FIG. 19

| ASSET #1: BOILER – DATE NEW 1/2001 | | | |
|---|---|---|---|
| DATE | EVENT | COST | EFFECT |
| 7/2010 | CUI EXTERNAL VISUAL | 1000 | REDUCES RISK COSTS BY $500/YR FOR 5 YEARS |
| 1/2011 | AC FIELD MEASUREMENT | 4000 | REDUCES RISK COST BY $800/YR FOR 10 YEARS |
| 10/2016 | CUI EXTERNAL VISUAL | 1000 | REDUCES RISK COSTS BY $400/YR FOR 3 YEARS |
| 1/2020 | REPLACE TANK | 40,000 | REDUCES RISK COSTS BY $0.5M OVER REMAINING PLAN PERIOD |
| ... | ... | ... | ... |
| ASSET #2: STEAM PIPING J6 – DATE NEW 1/2001 | | | |
| 1/2009 | CUI EXTERNAL VISUAL | 1000 | REDUCES RISK COSTS BY $1400 OVER 7 YRS |
| 1/2016 | CUI EXTERNAL VISUAL | 1000 | REDUCES RISK COSTS BY $1400 OVER 7 YRS |
| 1/2023 | CUI EXTERNAL VISUAL | 1000 | REDUCES RISK COSTS BY $1400 OVER 7 YRS |
| ... | ... | ,,, | ... |
| ASSET #3: ... | | | |
| .. | ... | ... | ... |

ASSET MANAGEMENT SYSTEMS AND METHODS

CROSS-REFERENCE TO RELATED APPLICATIONS

The present application relates to co-pending U.S. patent application Ser. No. 11/836,759, entitled "System, Method, and Computer Readable Storage Medium to Determine Optimization of Assets" and filed on Aug. 9, 2007 by inventor Ryan Sitton, and which is hereby incorporated herein by reference. The cited application claims priority to Provisional U.S. Patent Applications 60/821,938 and 60/917,584, both of which are also hereby incorporated herein by reference.

BACKGROUND

The present disclosure relates asset management systems and methods that formulate schedules for inspection, maintenance, repair, replacement, and remedial activities while optimizing total costs. The optimization may occur in a manner that accounts for risk-weighted costs, multiple degradation modes, inspection failures, schedule constraints, and return on investment (ROI) requirements.

The term "plant" as used herein means the equipment (including machinery, tools, instruments, fixtures, and the buildings containing them) necessary for an industrial or manufacturing operation. Petroleum refineries, plastics companies, chemical manufacturers, and water processors are examples of industrial operations that employ a plant to produce their products. FIG. 1 shows an illustrative plant and it is described here to provide some context for understanding the novel systems and methods of the present disclosure. It is important to note that the disclosed systems and methods have wide applicability and are in no way limited by the following description of an illustrative plant.

FIG. 1 is taken from issued U.S. Pat. No. 6,350,354 (Neuman et al.), and full details of its operation can be found there. It is briefly described here to illustrate the complexity of even a relatively simple industrial plant and to demonstrate some of the challenges faced by a plant manager trying to operate the plant in an economical fashion.

FIG. 1 is a schematic representation of a modular solvent extraction plant. Piping 10 transports a raffinate fluid onto a leach area 12, where it extracts metal from the ore found there. Line 14 and pump 16 transfer the pregnant leach solution to a plug flow contactor 18, where it mixes with organic solution from line 22. (A pump 20 in line 22 draws the organic solution from later process stages and make-up fluid from line 39.) Contactor 18 forms a mixed emulsion of the two fluids, which exits through piping 24 to reactor 26. After a dwell time in the reactor, the mixed emulsion travels through piping 27 to a separator 28. Separator 28 separates the extraction emulsion into a raffinate and a loaded organic solution. Piping 30 transports the raffinate to raffinate coalescer 32, which removes organic entrainment and expels it via line 34. The raffinate fluid is returned to the leach area 12 via piping 10, along with aqueous "make-up" solution from piping 31.

The loaded organic solution from separator 28 flows through piping 36 to contactor 100. Piping 107 feeds the mixture leaving contactor 100 into scrub station separator 108. Scrub station separator 108 separates the aqueous solution and the loaded organic solution. Optionally, a coalescer unit may be attached to scrub station separator 108 so as to further remove any aqueous entrainment from the organic solution. Piping 110 transports aqueous solution from scrub station separator 108. Piping 110 is connected to piping 102, allowing a pump 104 to recycle aqueous through the contactor 100. Bleed stream 114 allows aqueous solution in piping 100 to exit the system. Line 106 (coupled to input piping 31) transports make-up aqueous solution to line 102.

A pump 42 conveys loaded organic solution from scrub station separator 108 via piping 112 to plug flow contactor 44 for stripping. A separate pump 47 provides an electrolyte solution to contactor 44 via piping 46. Contactor 44 mixes the loaded organic solution and the electrolyte solution to form a second mixed emulsion. Line 48 transports this mixed emulsion from contactor 44 to second reactor 50, which allows for most of the dwell time of the emulsion. Line 51 transports the mixed emulsion from reactor 50 to second separator 52. Separator 52 separates the mixed emulsion into a barren organic solution and a metal electrolyte solution. Pump 20 pumps the barren organic solution, which is in line 22, from separator 52 to contactor 18 for recycle. Piping 54 transports the metal electrolyte solution from separator 52 to electrolyte coalescer 56. Piping 58 transports recovered organic entrainment from electrolyte coalescer 56. Piping 59 transports the metal electrolyte solution from coalescer 56 to an electrowinning tankhouse 60 via the tankhouse piping circuit. Metal cathodes are obtained from electrowinning tankhouse 60 and are represented as exiting tankhouse 60 by line 64. Piping 46 transports electrolyte solution from electrowinning tankhouse 60 to contactor 44 via pump 47 for recycle. Line 62 feeds an electrolyte make-up solution into electrowinning tankhouse 60. Supporting components, such as holding tanks required for surge capacity and mixers for treating the process streams with additives are also needed, but are not shown here.

The various fluids employed in this process can be expensive and/or harmful to the environment or workers who are inadvertently exposed to them, and thus the plant manager is motivated to avoid leaks. Moreover, the plant manager is motivated to maximize the return on investment, which generally requires minimizing downtime and avoiding process inefficiencies in the process. Thus, to the extent that it is economically feasible, the plant manager will perform inspections to monitor corrosion, thinning, cracking, creep, mechanical failure, internal component degradation, and fouling, and will take corrective action. However, when managing hundreds or thousands of components having varying levels of criticality and varying rates of degradation, while relying on inspection methods with varying degrees of success at detecting different degradation modes, plant managers routinely rely on the most conservative approach to inspection and maintenance that their budgets will allow. This approach hurts the profit margin and, if the budget is too tight, unnecessarily increases the risk of catastrophic failure and the corresponding costs associated therewith. Moreover, this approach fails to quantify the benefit of equipment improvements or modifications versus continual inspection and repair efforts.

U.S. Pat. No. 4,998,208, entitled "Piping Corrosion Monitoring System Calculating Risk-Level Safety Factor Producing an Inspection Schedule" by R. P. Buhrow et al., discloses a computerized system for calculating subsequent inspection dates for piping circuits based ultimately on previous inspection measurements, subjective evaluations of risk, and suggested safety factors. The Buhrow patent is representative of the existing management proposals of which the applicants are aware. Existing asset management techniques rely heavily on heuristic approaches and uniformly fail to determine an optimum, quantitative balance between economic costs and benefits (such as risk amelioration) when formulating an asset management plan.

SUMMARY

Accordingly, various systems and methods for formulating an optimal asset management plan are disclosed herein. At least some of the disclosed system embodiments comprise a memory that stores reliability, hazard, and integrity optimization software; and one or more processors coupled to the memory to execute the software. The software configures the one or more processors to: obtain a list of assets to be managed; obtain a set of applicable degradation modes; generate a prediction of whether each asset will fail from each given degradation mode within a given time frame and estimate any corresponding failure costs; determine risk-weighted costs over the time frame for each degradation mode of each asset; combine the failure and risk-weighted costs to obtain a total management cost; and analyze whether various actions reduce the total management cost. The software may then determine an optimal schedule of actions for each asset and display the schedule to a user of the system. The failure and risk-weighted costs may account for direct costs, safety costs, environmental costs, and business costs.

Also disclosed herein is a computer-usable medium having reliability, hazard, and integrity optimization software. In at least some embodiments, the software comprises an input module, a failure model module, a simulation module, and an optimization module. The input module accepts a list of assets to be managed and includes design, construction, process, and historical performance data for each asset. The failure model module determines probability of failure curve parameters for each degradation mode of each asset. The simulation module predicts asset failures to determine failure costs, and further calculates risk-weighted costs for each degradation mode of each asset. From the failure costs and risk-weighted costs, the simulation module determines a total management cost for the current management plan. The optimization module generates alternative management plans for evaluation by the simulation module and provides a selected management plan for display to a user. In each embodiment, the set of degradation modes considered may include corrosion, thinning, cracking, creep, mechanical failure, and fouling.

BRIEF DESCRIPTION OF THE DRAWINGS

A better understanding of the various disclosed embodiments can be obtained when the following detailed description is considered in conjunction with the accompanying drawings, in which:

FIG. 1 is a schematic representation of an illustrative modular solvent extraction plant;

FIG. 2A is a perspective view of an illustrative computerized system for formulating an asset management plan;

FIG. 2B is a block diagram of the illustrative system of FIG. 2A;

FIG. 3 is an illustrative table of the characteristics for various inspection techniques;

FIG. 4 is an illustrative table of activities required for specified events;

FIG. 5 is an illustrative table of characteristic values for various process fluids;

FIG. 6 is an illustrative table of value factors for various asset types;

FIG. 7 is an illustrative table of default values for various activities;

FIG. 8 is an illustrative list of plant assets;

FIG. 9 is a set of illustrative asset information forms;

FIG. 10 is an illustrative asset-specific degradation information form;

FIG. 11 is an illustrative asset-specific activity information form;

FIG. 19 is an illustrative asset management plan.

Figures 12, 13:
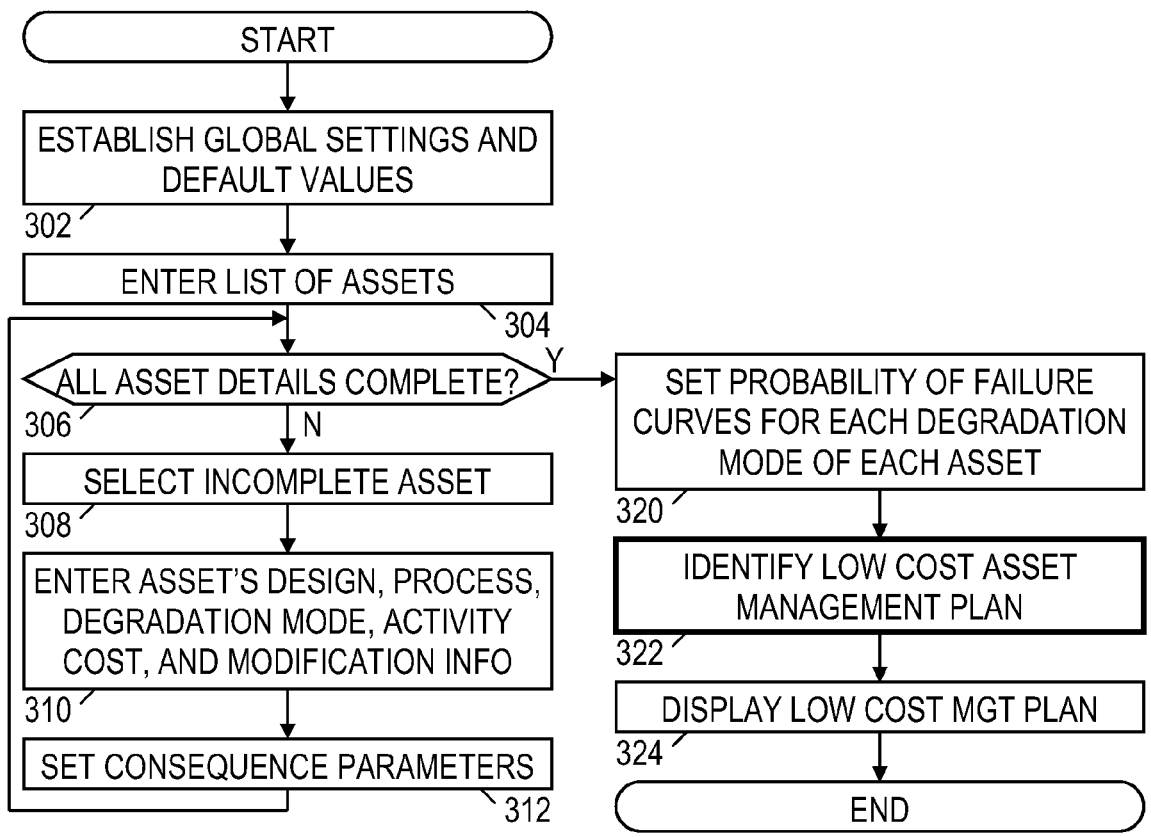
FIG. 12 is an illustrative asset-specific modification information form.
FIG. 13 is a flowchart of an illustrative method for formulating an asset management plan.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

At least some of the asset optimization systems and methods disclosed herein will account for varying rates of multiple degradation modes for components having varying degrees of criticality. Moreover, at least some of these systems and methods will account for the costs of various inspection methods and the varying degrees of success in degradation mode monitoring associated therewith. Still further, at least some of these systems and methods will recommend inspection and maintenance schedules based at least in part on the costs and benefits of various maintenance and modification options. In this manner, at least some of these systems and methods will provide users with an asset management plan that optimizes allocation of the management effort and budget, so as to maximize the plant's profitability over a given time frame.

The systems and methods disclosed herein are readily adapted to a computerized implementation. An illustrative asset management system is shown in FIG. 2A in the form of a desktop computer having a chassis 202, a display 204, and one or more input devices 206. Illustrative removable information storage media 230 are also shown. The display 204 and the input devices 206 cooperate to function as a user interface. The display 204 often takes the form of a video monitor, but may take many alternative forms such as a printer, a speaker, or other mechanism for communicating information to a user. The input device 106 is shown as a keyboard, but may similarly take many alternative forms such as a button, a mouse, a keypad, a dial, a motion sensor, a camera, a microphone or other mechanism for receiving information from a user. In some embodiments, the display 204 and the input devices 206 are integrated into the chassis 202.

As shown in FIG. 2B, the illustrative system includes a display interface 210, a peripheral interface 212, a bus 214, at least one processor 216, a memory 218, a network interface 220, and an information storage device 222. The display interface 210 may take the form of a video card or other suitable interface that accepts information from the bus 214 and transforms it into a form suitable for display 204. Conversely, the peripheral interface may accept signals from input devices 206, 208 and transform them into a form suitable for communication on bus 214. Bus 214 interconnects the various elements of the computer and transports their communications.

Processor 216 gathers information from the other system elements, including input data from the peripheral interface 212 and program instructions and other data from the memory 218, the information storage device 222, or from a remote location via the network interface 220. (The network interface 220 enables the processor 216 to communicate with remote systems via a wired or wireless network.) The processor 216 carries out the program instructions and processes the data accordingly. The program instructions may further configure the processor 216 to send data to other system elements, including information for the user via the display interface 210 and the display 204.

The processor 216, and hence the system as a whole, generally operates in accordance with one or more programs stored on an information storage device 222. One or more of the information storage devices may store programs and data on removable storage media such as an optical disc or a flash drive. Whether or not the information storage media is removable, the processor 216 may copy portions of the programs into the memory 218 for faster access, and may switch between programs or carry out additional programs in response to user actuation of the input device. The additional programs may be retrieved from information the storage device 222 or may be retrieved from remote locations via the network interface 220. One or more of these programs configures the system to carry out at least one of the asset management methods disclosed herein.

Stated in another fashion, the methods described herein can be implemented in the form of software that can be communicated to a computer or another processing system on an information storage medium such as an optical disk, a magnetic disk, a flash memory, or other persistent storage device. Alternatively, such software may be communicated to the computer or processing system via a network or other information transport medium. The software may be provided in various forms, including interpretable "source code" form and executable "compiled" form. The various operations carried out by the software may be written as individual functional modules (e.g., "objects", functions, or subroutines) within the source code.

At least some of the system and method embodiments described below are readily adapted to particular plants and conditions through the use of parameter tables and component-specific data forms. FIGS. 3-7 show an illustrative set of such parameter tables that can be used to make cost vs. benefit judgments of various management options. These tables can be represented in the form of database tables, spreadsheets, data entry forms, and other representations suitable for entering or storing data for software access.

FIG. 3 is an illustrative table that specifies default characteristics for each of various inspection techniques. (As will be discussed further below, these characteristics can be customized for each asset.) The names of various inspection techniques are shown in the left column, including external visual inspection, internal visual inspection, external ultrasonic inspection, internal ultrasonic inspection, magnetic particle inspection, penetrant testing, radiographic testing, profile radiography, AC field measurement (ACFM) inspection, ultrasonic shear wave inspection, tube eddy current inspection, pulsed eddy current inspection, corrosion under insulation (CUI) inspection, automated ultrasonic inspection, and strapping inspection. This list is only illustrative and other inspection techniques may be included or some techniques may be omitted as suitable for the plant.

The second column indicates whether the inspection technique requires that the component be shutdown for inspection, or if the component can be inspected during operation. The third column indicates whether the inspection technique requires that the component be disassembled for inspection. The fourth column contains an estimated cost for that inspection technique. This cost is simply for the materials and effort to carry out the inspection. In some embodiments, the effort or "man hours" of employee time is split out and treated as a separate cost category.

The remaining columns in the table of FIG. 3 are headed by various different degradation modes, including external (non-insulated) corrosion, corrosion under insulation (CUI), general thinning, partially localized thinning, highly localized thinning, stress cracking, non-stress cracking, deformation ("creep"), mechanical failure, internal degradation, and fouling. Again, this list is only illustrative, and other degradation modes may be included or some of these modes may be omitted or considered in a combined category. For each of the inspection techniques, these columns include a percentage value indicating a probability of detecting a change in level of degradation using that technique. For example, degradation due to external corrosion can be reliably monitored in most cases by external visual inspection, but crack propagation cannot. Conversely, ACFM can normally be used to monitor stress cracking with high accuracy, but not to monitor degradation due to corrosion. The default percentages can be set based on a scientific analysis of the various inspection techniques, either alone or in combination with the judgment of experienced inspectors.

FIG. 4 is an illustrative table that specifies the default activities required for various generally universal events such as inspection, and repairs of various degrees. The table of FIG. 4 includes rows for intrusive inspections, non-intrusive inspections, automated ultrasonic (AUT) inspections, leak repair, catastrophic failure repair, and repairs due to fouling or failures of internal components. The listed activities include disassembly, reassembly, cleaning, scaffolding deployment, insulation, painting, chemical injection under upset conditions, minor repairs, major repairs, and component replacement, but these activities are only illustrative. Each column specifies whether that activity is required for that event. For example, intrusive inspection is expected to require disassembly, cleaning, and reassembly.

FIG. 5 is an illustrative table that specifies parameter values for various process fluids. The first column provides a list of process fluids that may be employed by the plant. The second column provides a "severity of exposure" or SOE probability factor that will be used to adjust the economic calculations when workers are at risk of being exposed to the fluid. (The use of this and other factors will be explained further below.) The third column provides an estimated cleanup cost (ECC) (e.g., in dollars per thousand barrels) to perform environmental remediation for leaks of each process fluid.

FIG. 6 is an illustrative table of replacement value multipliers for different asset types. The first column provides a list of asset types, e.g., drum, exchanger, reactor, separation tower, cooling fin, piping, etc. The second column provides a replacement value multiplier for each asset type. This multiplier will be used to adjust the economic calculations when determining the cost of replacing an asset.

FIG. 7 is an illustrative table of default cost values for various asset types. The first column provides a list of the activities which were discussed above, e.g., disassembly, reassembly, cleaning, etc. Other activities may also be included, e.g., chemical injection costs (per year) for normal operations is also included in the illustrative table. The remaining columns provide asset-type specific costs for each of the activities. In some embodiments, employee costs (expressed in terms of man-hours) are split out from the other costs associated with performing the activity, e.g. scaffolding deployment and recovery for a separation tower may require 22 man-hours and $4000 in equipment rental and transportation fees. In the absence of specified default values for minor and major repairs, the software may estimate repair costs as a default percentage of the replacement asset value (RAV) for the asset. For example, minor repairs may default to 10% of the RAV, while major repairs could default to 40% of the RAV.

Various software embodiments may include additional tables not shown here. For example, a table of corrosion rates of different materials in different environments may be included to improve degradation rate calculations. Such corrosion rate tables are widely available from various standard reference sources such as the American Petroleum Institute (API) Publication 581. Another table that may be included to improve the accuracy of replacement cost estimates is a table of material prices. For example, the cost per ton of various materials including plastics and metals such as stainless steel, iron, aluminum, brass, bronze, copper, nickel, and various special-purpose alloys.

Other parameters that may be configurable for the software include: average number of personnel in a plant (N) (defaults to one), cost of a safety incident (CSI) (e.g., an accident involving harm to a worker, defaults to $10 million), recordable incident rate (RIR) (e.g., number of reported accidents per 100,000 man hours worked, defaults to 0.35), average cost of recordable incident (defaults to $500,000), upper limit for deformation (defaults to 10%), upper limit on probability of failure (defaults to 90%), repair value coefficient (e.g., a multiplier of the replacement asset value, defaults to 25%), return on investment window (e.g., a time limit for cost-benefit evaluations, defaults to 3 years), plan period (defaults to 20 years), daily operating margin (DOM) (e.g., average daily profit for the plant provided under normal operating conditions), maximum paint/coating life (defaults to 10 yrs), and any planned turnaround dates. A "turnaround" is a scheduled large-scale maintenance activity during which a process unit is shutdown for a comprehensive revamp and renewal. In some plants, turnarounds are scheduled regularly every 2-4 years, though in some cases they may occur every 6 months, or only once every 10 years. The scheduling of inspection or repair events during a turnaround is advantageous because the business cost for these activities becomes zero (i.e., no extra downtime is incurred).

Although the foregoing tables and parameters can specify plant-specific information, it is expected that these tables will contain information of more general applicability, e.g., information applicable to all the plants owned by a company, or information applicable to all customers of a consulting company. With the information in the foregoing tables having been made available to the software, the user can begin entering information specific to the assets for which a management plan is desired.

FIG. 8 shows an illustrative table listing details of the assets in a plant. The first column provides the asset number, which may simply be a numeric index 1, 2, . . . , n. The second column provides the asset type, e.g., pump, piping circuit, exchanger, reactor, tower, etc. The third column provides the unit identifier, which may be serial number or an abbreviated descriptor of the unit's characteristics. The fourth column provides a more readable description of the unit, and the fifth column specifies a location where the asset can be found in the plant. For each of the assets in the list, the system may prompt a user to enter data from an asset information form.

FIG. 9 shows an illustrative asset information form having an identification area 252, a design/construction area 254, and a process data area 256. This form may initially be a paper form having blanks for written data entry. Once plant personnel or contractors have completed the forms, a user may transfer the data into a computer via similarly configured electronic data entry forms.

Identification area 252 includes fields for entering a unit identifier, an asset number, a short description of the asset, an asset type, and the date that the asset was built or most recently refurbished. Design/construction area 254 includes fields for entering design pressure (or, in some embodiments, the maximum allowable working pressure MAWP), design temperature, material of construction, insulation, diameter, length, nominal thickness, minimum allowed thickness, last inspection date, thickness at last inspected date, and personnel exposure factor (PEF). This last field accepts a factor that modifies the recordable incident rate (RIR) that is applied to man-hours performed on the asset. The factor may be specified in terms of LOW (50% of average RIR), MEDIUM (100% average RIR), or HIGH (150% average RIR). In some embodiments, the software automatically assumes a HIGH personnel exposure factor for any work that is performed in response to failures or unplanned shutdowns.

In the design/construction area 254, a field may also be provided for a replacement asset value (RAV). Some embodiments of the software will calculate a default RAV from the product of the asset type value factor (FIG. 6), material cost, MAWP, diameter, and length. Nevertheless, if actual replacement values are available, they may be entered into this field.

The process data area 256 includes fields for entering identifiers for the top five process fluids (by volume) residing within or traveling through the asset. (The number of process fluids is illustrative and can be varied if desired.) For each process fluid, a filed is given for specifying the volume percentage. The process data area 256 further includes fields for specifying the asset's operating temperature and operating pressure. A field may be included for specifying operation type (e.g., continuous or cyclic/intermittent operation). Supplemental fields may be included for specifying outage consequences, including plant production drop if the asset fails (abbreviated as "standby factor" or "SF"), typical outage time (in days) for repairing a leak, and typical outage time (in days) for repairing a catastrophic failure.

Preferably, an asset information form is filled out for each asset. Supplemental information forms may be provided for some or all of the assets to replace default parameter values with more accurate asset-specific values. For example, FIGS. 10-12 show illustrative supplemental information forms, each of which includes an asset identification area specifying unit, asset number, and description to enable the supplemental forms to be associated with the corresponding asset information form.

FIG. 10 shows an illustrative form for providing asset-specific degradation data. The degradation data area 258 includes a table of potential degradation modes for the asset, such as external corrosion for non-insulated portions of the asset, corrosion under insulated portions of the asset, general thinning, partially localized thinning, highly localized thinning, stress cracking, nonstress cracking, creep, mechanical failure, internal degradation, and fouling. The first column identifies the degradation mode, the second column provides areas for entering the corresponding degradation rate or susceptibility, the third column provides areas for entering the last inspection date, the fourth column provides areas for entering the last inspection technique, and the fifth column provides areas for entering the consistency of the failure mode. In some embodiments, the values in this last column may be expressed in the form of "none", "low", "medium", or "high" to indicate whether under identical use conditions, similar assets would be expected to fail unpredictably or in a fashion that is loosely clustered, moderately clustered, or tightly clustered around an average lifetime. The usage of these consistency values is discussed further below.

FIG. 11 shows an illustrative form for providing asset-specific activity information. The activity cost data area 260 includes a table of potential activities, such as disassembly, reassembly, cleaning, scaffolding erection, insulation, painting, chemical treatment injection under normal operating conditions (per year), chemical treatment injection under upset conditions, minor repairs, major repairs, and replacement. The first column identifies the activity, the second column provides areas for entering the number of expected man-hours to carry out that activity, and the third column provides areas for entering the expected cost to carry out that activity.

FIG. 12 shows an illustrative information form having a modification data area 262 with a table for specifying data regarding asset-specific modification information. The first column provides areas for specifying modification descriptions or labels. The second and third columns provide areas for respectively specifying the expected number of man-hours and costs required to initially perform the modification. The fourth and fifth columns provide areas for respectively specifying the expected number of recurring man-hours and costs (per year) required by the modification. (If the modification entails a recurring reduction in man-hours and/or a recurring cost savings, negative values may be entered into these areas.) The sixth column provides areas for specifying the effects of the modifications. For example, one modification may be equipping an asset with a water wash system to reduce corrosion. The water wash system may have an initial cost of $20,000 and an additional annual cost of $1000. For such a modification, the sixth column might indicate that the thinning rate is reduced by 80% for ten years, and that the mean time between failures (MTBF) for the exchanger bundle increases from 3 years to 10 years. Another modification might be the addition of a redundant asset to reduce the impact of a failure in the original asset. For such a modification, the sixth column might indicate that the outage time falls to zero. Some software embodiments provide drop-down boxes to enable a user to select the parameter that is altered by the modification, and the manner in which the parameter value is modified (e.g., on/off, multiplied, proportional, etc.).

With the foregoing information having been gathered for each of the assets to be managed, we now turn to a discussion of methods for formulating a plan to manage those assets. FIG. 13 is a flowchart of one illustrative method for formulating an asset management plan.

Beginning in block 302, a user of system 202 establishes the global parameters and default value settings for the plant. In some embodiments, this block includes entering, reviewing, correcting, and/or updating tables and parameters such as those shown in FIGS. 3-7 and otherwise discussed above. The software for system 202 may provide a series of prompts to the user to obtain these values directly (e.g., via text entry) or indirectly (e.g., via access to files or other resources specified by the user).

In block 304, the user specifies a list of assets to be managed. In some embodiments, this list may be entered manually, but it is expected that in most embodiments, this list is provided to the software in the form of a spreadsheet or a database table such as that shown in FIG. 8. The software then iterates through the list of assets in blocks 306-312. Block 306 represents a test to determine if all of the assets in the list have been considered. If not, in block 308, the software selects the first of the remaining assets that remain unconsidered. In block 310, the user is prompted to enter the asset-specific design and process information (see, e.g., FIG. 9), optional asset-specific degradation mode information (see, e.g., FIG. 10), optional asset-specific activity cost information (see, e.g., FIG. 11), and optional asset-specific modification information (see, e.g., FIG. 12).

In block 312, the software processes the available information to calculate consequence costs for the asset, before returning to block 306. For each event applicable to a given asset (e.g., replacement, modification, inspection, leak, catastrophic failure), the software calculates a cost that is the sum of direct costs, safety costs, environmental costs, and business costs. Each of these costs is discussed in turn.

The direct costs may be determined for each event shown in FIG. 4 by using the costs for the associated activities specified in FIGS. 7 and/or FIG. 11. Modification costs may be determined from FIG. 12. Note that quantity of work effort can also be determined for each event from the man-hour values entered in these tables. This work effort (W) is part of the basis for calculating the safety cost.

$$\text{Safety Cost,Work} = PEF*RIR*W*CSI, \quad (1)$$

where PEF is the personnel exposure factor (discussed above with respect to FIG. 9), RIR is the recordable incident rate, W is the work effort, and CSI is the average cost of a safety incident. For leaks or catastrophic failures, there is also an added cost for potential exposure to process fluids;

$$\text{Safety Cost,Exposure} = SOE*(N/AC)*(k*MAWP*D)*CSI, \quad (2)$$

where SOE is the severity of exposure (discussed above with respect to FIG. 5), N is the average number of personnel typically in the plant at any given time, and AC is the asset count. (By default, the software uses the number of assets in the asset list (e.g., FIG. 8) as the asset count, but this value can be entered manually if desired.) In equation (2), MAWP is the maximum allowable working pressure (discussed above with respect to FIG. 9), D is the diameter (also discussed in FIG. 9), CSI is the average cost of a safety incident, and k is a scale factor that depends on the units used for expressing MAWP and D. In one embodiment where MAWP is expressed in psi and D is expressed in inches, k is set equal to $1/7200$.

Putting it together, the safety cost for replacement, modifications, inspections, and scheduled maintenance, is determined in accordance with equation (1) above. The safety cost for a leak is:

$$\text{Safety Cost,Leak} = (\text{Safety Cost,Exposure}) + (\text{Safety Cost,Work}) \quad (3)$$

The safety cost for a catastrophic failure uses a scaled value of the potential exposure cost:

$$\text{Safety Cost,Catastrophic} = 10*(\text{Safety Cost,Exposure}) + (\text{Safety Cost,Work}) \quad (4)$$

Although a scale factor of 10 is shown here, other scale factors can be employed as deemed appropriate.

The next consequence cost is the environmental cost, i.e., the cost of cleaning up a process fluid spill. In some embodiments, the environmental cost for a leak is calculated:

$$\text{Environmental Cost, Leak} = (k*MAWP*D)*\sum_i \%F_i*ECC_i \qquad (5)$$

where k, MAWP, and D are the same as described above for equation (2). % $F_i$ is the percentage of the ith process fluid employed in the asset, and $ECC_i$ is the corresponding estimated cleanup cost per thousand barrels of process fluid (e.g., as provided in FIG. 5). The environmental cost for a catastrophic failure may be calculated as a scaled value:

$$\text{Environmental Cost,Catastrophic}=10*(\text{Environmental Cost,Leak}) \qquad (6)$$

Although a scale factor of 10 is shown here, other scale factors can be employed as deemed appropriate. For events such as replacement, modifications, inspections, and scheduled maintenance, no fluid spills are expected and hence the environmental cost will be zero.

The final portion of the consequence cost determined in block 312 is the business cost. In at least some embodiments, the business cost for an event is calculated:

$$\text{Business Cost}=SF*DOM*L \qquad (7)$$

where SF is the standby factor (e.g., the percentage reduction in plant output caused by failure of the asset), DOM is the daily operating margin, and L is the outage time (in days) required by the event. The outage time is expected to vary for different types of events, e.g., a leak vs. a catastrophic failure. The consequence cost can then be calculated as:

$$\text{Consequence Cost,Event}=\text{Direct Cost}+\text{Safety Cost}+\text{Environmental Cost}+\text{Business Cost} \qquad (8)$$

and it is determined for each event that is applicable to the asset.

Figures 14, 15:
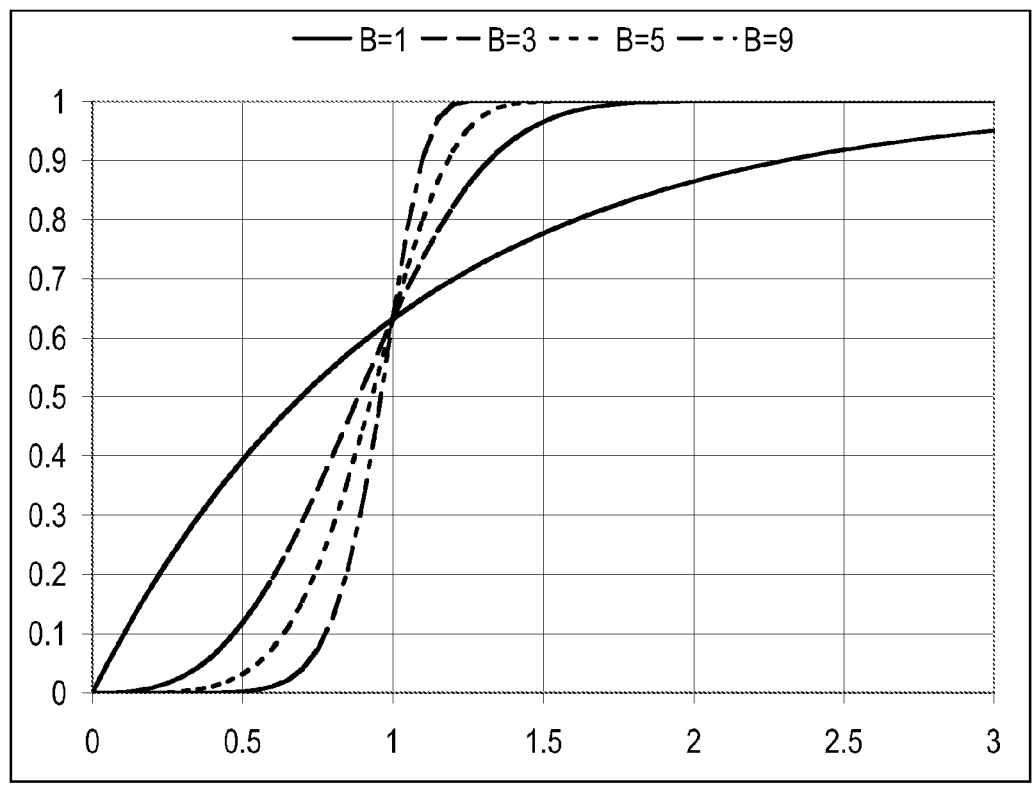
FIG. 14 is a table of illustrative model parameter values.
FIG. 15 shows illustrative cumulative distribution function (CDF) curves for various Weibull failure models.

Once the software determines that all of the asset details are complete in block 306 of FIG. 13, the software begins determining failure event probabilities. In block 320, the software determines the probability of failure curves for each degradation mode of each asset. In some software embodiments, Weibull curves are used to model the probabilities of failure. Weibull curves have a cumulative density function (CDF) of:

$$W(t)=1-e^{-(t/A)^B} \qquad (9)$$

where t is time since last overhaul or verified condition, A is a life factor (e.g., a time at which 63% of such assets have failed), and B is a shape factor (e.g., an indication of how distributed the failure pattern is). For at least some of the degradation modes, a modified CDF is employed:

$$P(t)=\min\{1,W(t)\times[1+C\times(t/A)]\} \qquad (10)$$

in which C is a consistency factor used to "amplify" the failure rate. It is worth noting that when C=0, equations (9) and (10) are equivalent. The shape factor B and consistency factor C may be determined from the consistency rating provided in the last column of FIG. 10. One illustrative table of parameter values is shown in FIG. 14. The first column lists the four consistency categories (none, low, medium, high). The second column (labeled "Beta") shows the corresponding shape factor values B for the four consistency categories. The third column shows the consistency factors C for the corrosion, thinning, cracking, and creep degradation modes. The fourth column shows the consistency factors C=0 for the fouling, internal, mechanical, bundle, and catastrophic degradation modes.

Figures 16, 17:
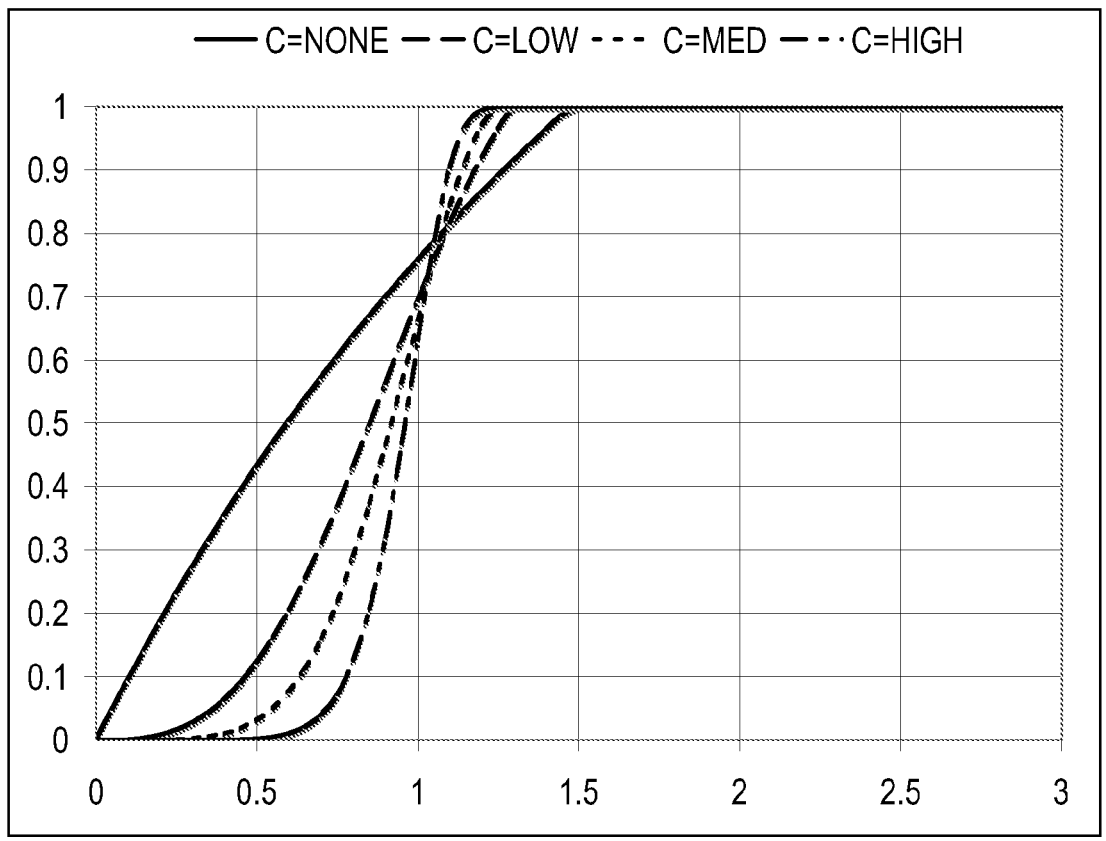
FIG. 16 shows illustrative CDF curves for various modified Weibull failure models.
FIG. 17 is a table of additional illustrative model parameter values.

The CDF curves for when C=0 are shown in FIG. 15 for different shape factors B=1, 3, 5, and 9, corresponding to the consistency categories of none, low, medium, and high. The horizontal axis for this figure and the next one is time scaled by the life factor (t/A). When the consistency factors C from the third column in FIG. 14 are employed as given by equation (10), the curves are as shown in FIG. 16. Generally, it may be observed that the cumulative probability of failure has the sharpest rise near t=A when the consistency category is high. Conversely, the cumulative probability of failure has the most gradual slope (but the increased chance of an early failure) when the consistency category is low or "none".

The selection of "time zero" (i.e., the point from which time t is measured when calculating failure probabilities) and life factor A also depend on the failure mode. FIG. 17 is a table listing various groups of failure modes in the left column. In the illustrated table, external corrosion, corrosion under insulation, and thinning are grouped together under "corrosion" for explanatory purposes, however, the probability of failure curves may be separately determined for each of these failure modes. Similarly, cracking and creep and grouped, as are fouling, internals, mechanical failure, and bundle failure, but a respective probability of failure curve may be determined for each of these degradation modes.

The second column of FIG. 17 lists various "time zero" determinations for each of the degradation mode groups, and the third column lists life factor calculation methods. For the degradation modes in the corrosion group, time zero is chosen as the date at which the baseline thickness measurement was made. Recall that a thickness measurement was provided in the asset information form of FIG. 9, and a degradation mode rate was optionally provided in the form of FIG. 10. Absent an asset-specific degradation mode rate, the software can determine an appropriate rate from a set of corrosion tables for different materials and environments, modified if necessary to account for paint, insulation, or other conditions. In some embodiments, the software accounts for coatings or paint using the multiplier fraction (paint life)/(maximum paint life). Thus, a 3 year old coating with a 10 year lifetime would reduce the corrosion rate to $\frac{3}{10}$ of its original value. From the thickness and degradation rate values, a modified remaining lifetime (MRemLife) parameter can be found:

$$\text{MRemLife,Corrosion}=POD*(\text{baseline thickness}-\text{minimum thickness})/\text{rate} \qquad (11)$$

where POD is the probability of detection associated with the last inspection technique used to check for the appropriate type of corrosion, and minimum thickness is a value calculated using the applicable code of construction (e.g., the API 579-1/ASME FFS-1, Jun. 5, 2007, Fitness-For-Service standard for pressure vessels). For corrosion, the life factor A is set equal to twice the MRemLife parameter.

For the crack/creep group, time zero is chosen as the date the asset was new or the date of the last applicable inspection that indicated no cracking or deformation was present. The MRemLife for cracking is calculated using a method based on the API 579-1/ASME FFS-1, Jun. 5, 2007, Fitness-For-Service standard. Alternatively, a table of default values for qualitative "low", "medium" and "high" levels of crack susceptibility could specify that crack depths respectively increase at 2, 4, and 8 mils per year, whereas the crack lengths respectively increase at 4, 8, and 16 mils per year. An equation similar to (11) could then be used to obtain a "MRemLife, Cracking" parameter value.

For creep, the "MRemLife" parameter can be calculated:

$$\text{MRemLife,Creep}=(\text{upper limit for deformation})/(\text{deformation rate}) \qquad (12)$$

For both cracking and creep, the life factor is set equal to the MRemLife parameter.

For the fouling, internals, mechanical failure, and bundle failure group, time zero is chosen as the date of last inspection or repair, and the life factor A is set equal to the mean time between failures (MTBF). Finally, the time zero for the catastrophic failure mode is chosen to be the date at which the asset was new or completely refurbished. The life factor A for the catastrophic failure mode is taken to be four times the minimum MRemLife parameter calculated for the degradation modes in the corrosion or cracking/creep groups. Note that the shape factor B for the catastrophic failure mode equals the shape factor B for the failure mode associated with the minimum MRemLife parameter.

Returning to FIG. 13, the software has determined, for each degradation mode of each asset, the life factor A, the shape factor B, the consistency factor C, and the time zero to. With these parameters, the software can readily determine, for any given date, a failure probability and the associated consequence cost. In block 322, the software employs the probability of failure curves, along with the consequence costs, to evaluate asset management plan alternatives and identify the optimal plan. In block 324, the software displays or otherwise outputs the low cost asset management plan for review and usage by the user.

Figure 18:
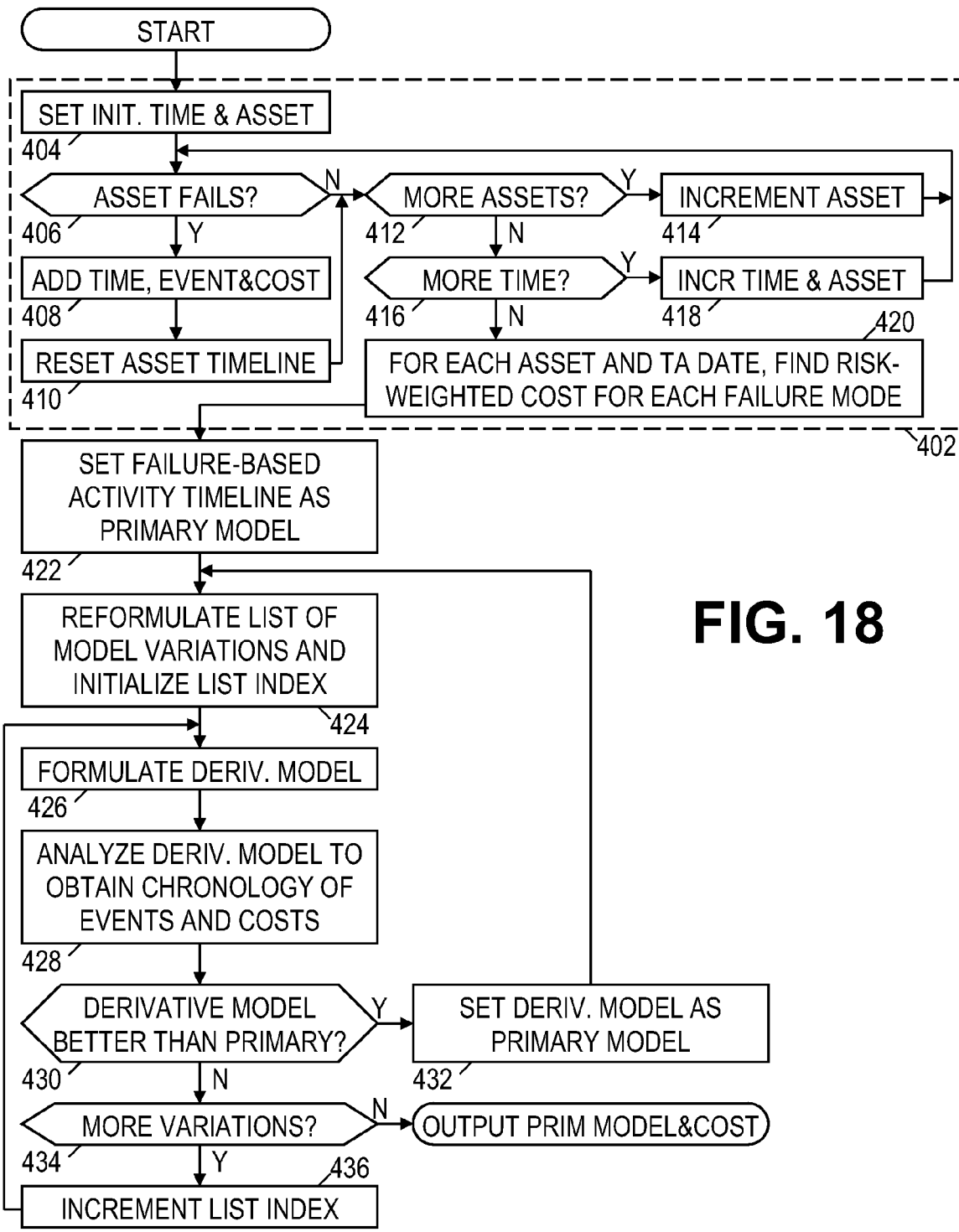
FIG. 18 is a flowchart of an illustrative method for identifying an optimum asset management plan.

FIG. 18 shows an illustrative method that may be employed by the software in block 322 to identify an optimum asset management plan. The illustrative method begins by determining the cost associated with a baseline plan, then systematically tries different options to determine if a better plan can be found, in which case the better plan becomes the baseline. In this example, the initial baseline plan can be described as "take action only when a failure occurs". The blocks enclosed in box 402 determine the cost associated with this plan.

Beginning in block 404, the software sets the time index equal to the beginning of the plan period, and selects the first asset from the list of assets. (The time index will be incremented systematically, e.g., in one month intervals, to test for events throughout the plan period.) In block 406, the software examines the probability of failure curves associated with each degradation mode for the asset to determine if the asset has failed at the current time index. In some embodiments, the software determines that a failure has occurred when the CDF exceeds some threshold such as 10%, 50%, or even 90%. If a failure occurs, then the failure is logged in block 408, possibly by storing the current time, some identification of the event, and the corresponding consequence cost, in an event and cost chronology. In block 410, the asset's "time zero" is reset to the current time. Depending on the event, this time zero reset may occur for all the degradation modes associated with the asset (e.g., when the asset is replaced due to catastrophic failure). In other cases, the reset may only occur for some of the degradation modes (e.g., for the internals and fouling degradation modes when the internals are replaced due to failure).

Having dealt with a failure in blocks 408-410, or if the asset hasn't failed in block 406, the software checks in block 412 to see if all the assets have been tested for failure at the current time index. If there are untested assets, then the software selects the next asset and returns to block 406. Once all of the assets have been tested, the software checks in block 416 to determine if the time index has reached the end of the plan period. If there is time left, then in block 418, the software increments the time index and returns to the beginning of the asset list to repeat the failure testing process for each of the assets at the new time. In at least some of the embodiments, the time index is incremented by one month intervals. In other embodiments, the increment is one day or one week.

Once the software determines in block 416 that the end of the plan period has been reached, the software performs a risk-based calculation. At the end of the plan period, and at each of the planned turnaround dates, the software calculates a risk-weighted cost for each degradation mode of each asset. The risk-weighted cost is the cumulative probability of failure for a given degradation mode of a given asset, multiplied by the corresponding consequence cost. Because the cummulative probability of failure curves are used, the risk weighted costs include all preceding risk-weighted costs unless there has been a change to the probability of failure curve (e.g., due to an inspection or modification).

The software calculates the cost of this asset management plan as a sum of the risk-weighted costs, plus the consequence costs of all the failures. Note that the sum should account for the use of the cumulative probability of failure in calculating risk-weighted costs, so that this sum does not include risk-weighted cost calculations for turnaround periods having no change to the probability of failure curves for an given asset. Thus, for example, if a given asset has no change to its probability of failure curves during a plan period, the sum only needs to include the end-of-period risk-weighted cost for that asset.

In block 422, the software stores the initial baseline plan (consisting of just fixing the failures as they occurred) as the primary model, and records the cost. In block 424, the software formulates a list of model variations. In some embodiments of the software, the model variations include each of the possible events (e.g., each of the inspections, modifications, repairs, and replacements) that can be applied to (or, if already planned, can be dropped from) each of the assets at each of the time indexes. In other embodiments of the software, the model variations are limited to those variations that are likely to reduce the cost of the plan, such as scheduling preventative maintenance and certain types of inspections during each turnaround period, replacing assets before they fail, etc. In some specific embodiments, the following guidelines are employed to formulate the list of model variations:

1. For all items with a calculated failure, schedule a repair during the turnaround prior to the failure.
2. Schedule intrusive inspections during each turnaround.
3. Schedule periodic non-intrusive inspections, with the period varying in six-month increments from zero (no inspection) to the full plan period.
4. Schedule preventative repairs at each turnaround.
5. Schedule modifications at each turnaround and re-evaluate effects of guidelines 1-4

It is noted elsewhere that the optimization process may be iterative, with a new baseline model being selected each time an improvement is found. In such cases, the list of variations is preferably a complete list each time it is generated, so as to ensure that all possible variations on the current model are attempted before the current model is selected as being optimal.

In block 424, the software also sets a list index to select the first model variation from the list. In block 426, the software formulates a derivative model. The derivative model is the same as the primary model, except it includes the current variation identified by the list index. The derivative model may take the form of a list of scheduled events provided by the primary model, with the modification required for the current model variation.

In block 428, the software analyzes the derivative model to obtain a complete event and cost chronology for the derivative model. In some embodiments, this analysis is carried out in the same fashion as given within box 402, except that in addition to testing for asset failures, the software also checks the derivative model's list of scheduled events and adds them to the chronology along with their associated costs. Where appropriate, the probability of failure curve parameters are adjusted to account for the effects of the scheduled event. The risk-weighted costs are calculated and added to the chronology costs to obtain a total cost for the derivative model.

In block 430, the derivative model is compared to the primary model to determine which is better. In some embodiments, the decision is based solely on a comparison of total costs. In other embodiments, the comparison employs a return on investment (ROI) analysis in which the derivative model is only judged better than the primary model if the savings garnered by a given expenditure exceed the expenditure, and moreover, only if the savings exceed the expenditure by at least a predetermined percentage within a given time window following the expenditure.

If the derivative model is determined to be better, the software accepts the derivative model as the primary model in block 432, and returns to block 424 to formulate a new list of model variations. Otherwise, in block 434, the software checks to determine if more model variations exist, and if so, the software updates the list index in block 436 and returns to block 426 to formulate a new derivative model. If all the model variations have been tried without finding a better model, the software outputs the primary model as the best asset management plan.

FIG. 19 shows an illustrative asset management plan organized by asset. (Other formats are also suitable and may be preferred for some applications. For example, some maintenance personnel may desire a strictly chronological presentation.) In the illustrative plan, each asset has an associated section in which that asset's events are presented in chronological order with associated costs and effects. (In some formats, the cost may be expressed in terms of one-time costs and recurring costs.) It can be observed that the asset management plan put forth by the systems and methods presented herein can be framed as a series of recommendations for action at scheduled times. If followed, the recommendations will provide an optimal tradeoff between action costs and benefits in a manner that accounts for direct costs, safety costs, environmental costs, and business costs, appropriately adjusted by the risks for each failure mode.

Though the flowcharts of the illustrative methods discussed above show a specific order of operations, it should be recognized that these operations can be reordered and often executed concurrently. The programs and/or data for executing these operations can be stored in on any type of computer readable storage medium (e.g. CD-ROM, DVD, disk, etc.)

Since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A non-transitory computer readable storage medium that, when placed in operable relation to a processing device, provides software to effect a determination of an optimal asset management plan, the software comprising:
    an input module that accepts a list of assets to be managed and accepts design data and process data for each asset;
    a failure module that determines probability of failure curve parameters for each of a plurality of degradation modes of each asset;
    a simulation module that predicts asset failures based on the probability of failure curve parameters at a particular time exceeding predetermined failure probability thresholds, and determines failure costs for each asset failure that is predicted to have occurred based on the predetermined failure probability thresholds being exceeded, and
    wherein the simulation module further calculates risk-weighted costs for each degradation mode of each asset, wherein each risk-weighted cost corresponds to a cumulative probability of failure determined from the failure curve parameters, multiplied by a consequence cost, wherein said simulation module produces a total management cost that includes scheduled event costs and a combination of the failure costs and the risk-weighted costs; and
    an optimization module that generates alternative management plans for evaluation by the simulation module and provides an optimal management plan for display to a user.

2. The medium of claim 1, wherein the optimal management plan represents the lowest cost to return ratio for the list of assets.

3. The medium of claim 1, wherein the failure costs and risk-weighted costs include a direct cost, a safety cost, an environmental cost, and a business cost, and wherein the safety cost is a function of personal exposure factor, recordable incident rate, work effort, average cost of safety incident, severity of exposure, and number of personnel in a plant.

4. The medium of claim 1, wherein the set of degradation modes includes corrosion, thinning, cracking, creep, mechanical failure, and fouling.

5. The medium of claim 1, wherein the input module further accepts asset-specific degradation data, asset-specific activity cost data, and asset-specific modification data.

6. A plant management method that comprises:
    identifying multiple assets in the plant;
    identifying multiple degradation modes;
    generating predictions regarding whether each asset will fail within a planned time frame based on probability of failure estimates at specific times within the planned time frame exceeding predetermined failure probability thresholds;
    estimating failure costs that would result from each generated asset failure prediction;
    determining risk-weighted costs over the planned time frame for each degradation mode of each asset, wherein each risk-weighted cost corresponds to cumulative probability of failure estimates over the planned time frame for each degradation mode of each asset, multiplied by a consequence cost;
    combining said risk-weighted costs and failure costs with scheduled event costs to obtain a total management cost; and
    displaying to a user an optimal management plan that specifies an inspection and maintenance schedule for each of said assets,
    wherein a processing device performs said generating, estimating, determining, combining, and displaying operations.

7. The method of claim 6, wherein for each predicted failure, the method further comprises generating subsequent predictions that account for repairs or replacements performed in response to previous predicted failures.

8. The method of claim 6, further comprising:
    establishing a primary model based on said predictions and costs;

formulating a derivative model by applying one or more variations to the primary model;

performing said generating, estimating, determining, and combining operations for the derivative model; and replacing the primary model with the derivative model if the derivative model is determined to be better than the primary model, wherein said determination is based at least in part on the costs of the primary and derivative models.

9. The method of claim 8, wherein said one or more variations are selected from a set of variations that include changing inspection schedules, changing types of inspections, applying preventative repairs, and applying modifications to the assets.

10. The method of claim 8, further comprising:

repeating said formulating, performing, and replacing operations to determine a model that provides a reduced-cost plan for managing said assets; and displaying the plan to a user.

11. The method of claim 6, wherein the degradation modes include corrosion, thinning, cracking, creep, mechanical failure, and fouling.

12. The method of claim 6, wherein said generating predictions includes:

determining probability of failure curve parameters for each degradation mode of each asset;

calculating a probability of failure based on the probability of failure curve parameters at one or more times within the planned time frame; and comparing each probability of failure to a threshold to predict whether failure will occur.

13. The method of claim 12, wherein the probability of failure curve parameters include a life factor and at least one parameter indicative of consistency.

14. The method of claim 6, wherein said estimating a cost comprises determining a direct cost, a safety cost, and environmental cost, and a business cost, and wherein the safety cost is a function of personal exposure factor, recordable incident rate, work effort, average cost of safety incident, severity of exposure, and number of personnel in a plant.

15. A reliability, hazard, and integrity optimization system that comprises:

a memory that stores optimization software; and one or more processors coupled to the memory to execute the software, wherein the software configures the one or more processors to:

obtain a list of assets to be managed;

obtain a set of degradation modes applicable to said assets;

generate a prediction of whether each asset will fail within a planned time frame based on probability of failure estimates at specific times within the planned time frame exceeding predetermined failure probability thresholds;

estimate failure costs that would result from each generated asset failure prediction;

determine risk-weighted costs over the time frame for each degradation mode of each asset, wherein each risk-weighted cost corresponds to cumulative probability of failure estimates over the planned time frame for each degradation mode of each asset, multiplied by a consequence cost;

combine said failure costs and risk-weighted costs with scheduled event costs to obtain a total management cost; and analyze whether various actions reduce the total management cost.

16. The system of claim 15, wherein the software further configures the one or more processors to:

determine a schedule of actions for each asset, wherein the schedule provides a reduced total management cost; and output the schedule to a user of said system.

17. The system of claim 15, wherein the set of degradation modes includes corrosion, thinning, cracking, creep, mechanical failure, and fouling.

18. The system of claim 15, wherein said actions include:

performing a repair to an asset during a turnaround preceding a predicted failure of that asset, performing an intrusive inspection of an asset at each turnaround;

performing periodic non-intrusive inspections of an asset; and performing a modification to an asset during a turnaround period.

19. The system of claim 15, wherein said estimated cost comprises a direct cost, a safety cost, an environmental cost, and a business cost, and wherein the safety cost is a function of personal exposure factor, recordable incident rate, work effort, average cost of safety incident, severity of exposure, and number of personnel in a plant.

20. The system of claim 15, wherein said generate a prediction includes:

determine probability of failure curve parameters for each degradation mode of each asset;

calculate a probability of failure based on the probability of failure curve parameters at one or more times within the planned time frame; and compare each probability of failure to a threshold to predict whether failure will occur.

\* \* \* \* \*